(12) United States Patent
Normandeau et al.

(10) Patent No.: US 12,420,879 B1
(45) Date of Patent: Sep. 23, 2025

(54) AUTOMATED EXTERIOR VEHICLE PART ASSEMBLY USING GLOBAL DATUM

(71) Applicant: Tesla, Inc., Austin, TX (US)

(72) Inventors: Hunter Robert Normandeau, Sunnyvale, CA (US); Theodore Antony, Cypress, CA (US); Patrick Worley, Newark, CA (US); Brian Paul Greviskes, Chicago, IL (US); Adrian Matthias Grossman, Palatine, IL (US); Mitchell Nollar, Austin, TX (US); Kevin Joseph Curtis, Riverside, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/677,172

(22) Filed: May 29, 2024

(51) Int. Cl.
*B62D 65/16* (2006.01)
*B62D 65/02* (2006.01)
*B62D 65/06* (2006.01)
*B62D 27/02* (2006.01)

(52) U.S. Cl.
CPC ........... *B62D 65/16* (2013.01); *B62D 65/028* (2013.01); *B62D 65/06* (2013.01); *B62D 27/026* (2013.01)

(58) Field of Classification Search
CPC ...... B62D 65/16; B62D 65/028; B62D 65/06; B62D 27/026; B62D 65/02; B23P 21/008; G05B 19/4189
See application file for complete search history.

(56) References Cited

U.S. PATENT DOCUMENTS

| | | | | |
|---|---|---|---|---|
| 4,852,237 A | * | 8/1989 | Tradt | B62D 65/06 29/709 |
| 6,061,887 A | * | 5/2000 | Kawasaki | G05B 19/4189 29/709 |
| 7,178,227 B2 | * | 2/2007 | Ghuman | B62D 65/02 29/559 |

(Continued)

OTHER PUBLICATIONS

"Lotus Service Notes", (Aug. 1, 2022), 18 pgs.
"Korean Application Serial No. 10-2025-0069813, Voluntary Amendment Filed Jun. 24, 2025", w English Claims, 8 pgs.

*Primary Examiner* — Lee A Holly
(74) *Attorney, Agent, or Firm* — Schwegman Lundberg & Woessner, P.A.

(57) ABSTRACT

The present disclosure relates to an automated system and method for assembling exterior vehicle parts to a vehicle assembly structure. The system utilizes an automated assembly cell with fixtures corresponding to each exterior vehicle part and references a global datum for precise alignment. Exterior vehicle parts are secured to fixtures using vacuum clamps or other means, and a structural adhesive is applied to either the part or a part-receiving location on the vehicle assembly structure. The parts are then moved into their nominal positions relative to the global datum, thereby compressing the adhesive and completing the installation. The method improves assembly efficiency by compensating for substructure irregularities with an engineered adhesive gap and allows for continued assembly during adhesive curing through tacking operations. This technology streamlines the vehicle assembly process, enhances quality, and increases production rates by reducing manual labor and potential for error.

7 Claims, 16 Drawing Sheets

All Exterior Panels + Glazing Sequenced Install

(56) References Cited

U.S. PATENT DOCUMENTS

2013/0035783 A1* 2/2013 Scheuerman ......... B23P 21/008
　　　　　　　　　　　　　　　　　　　700/230
2014/0303330 A1* 10/2014 Kanagawa ........... C08G 18/758
　　　　　　　　　　　　　　　　　　　525/454

* cited by examiner

Vehicle Moves into Exterior Fixture Station(s)
Adhesives have been Applied to Exterior Panels

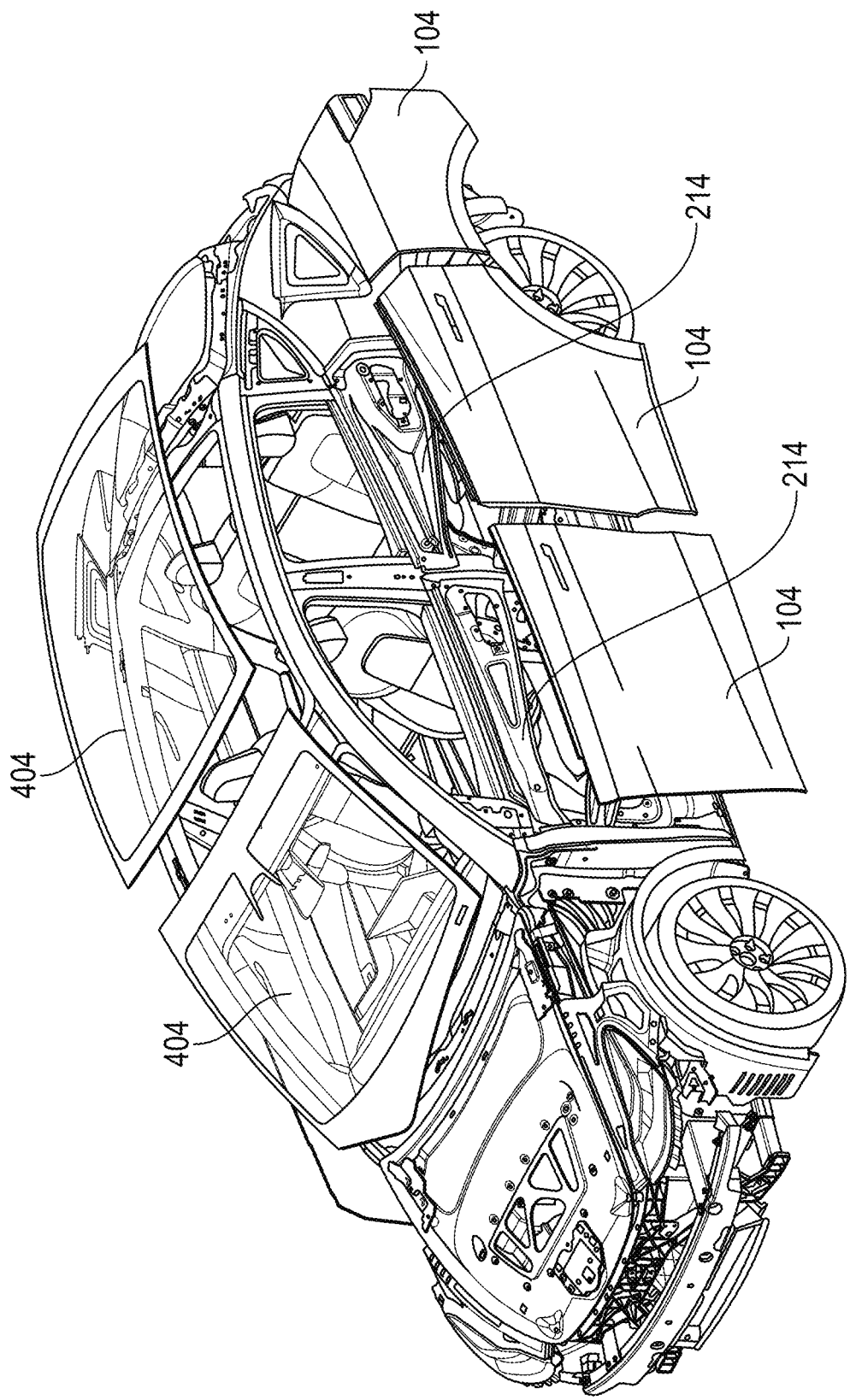
FIG. 4C  All Exterior Panels + Glazing Sequenced Install

Exterior-facing Electrical Connections are made Trim Closeouts Applied

Vehicle Exits Install Station(s) with Exterior Panels Secured

Aeroshields Fasten into Place

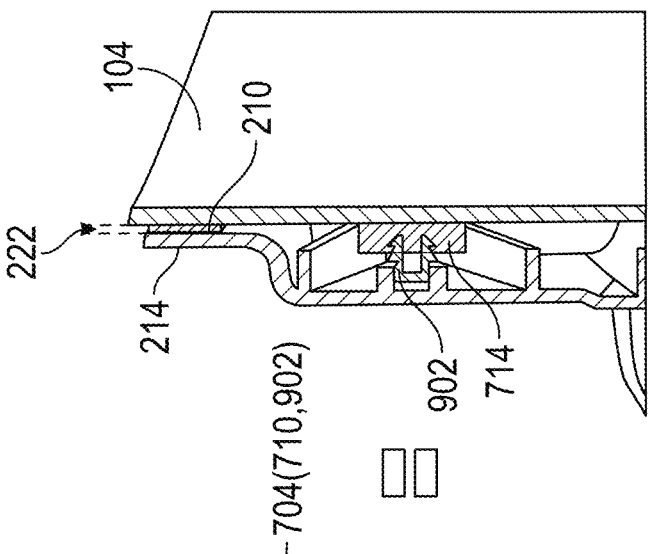
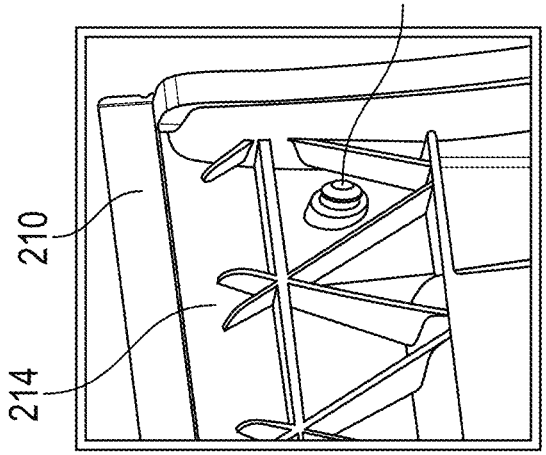
FIG. 7B
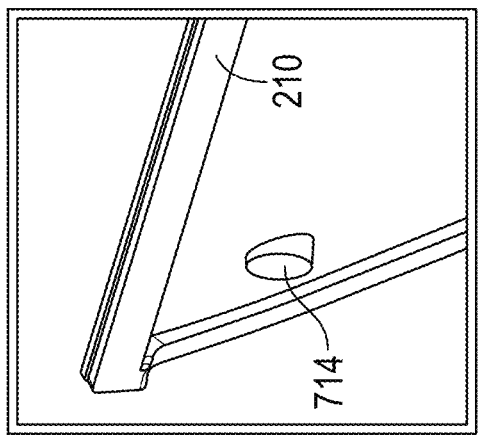
FIG. 7E
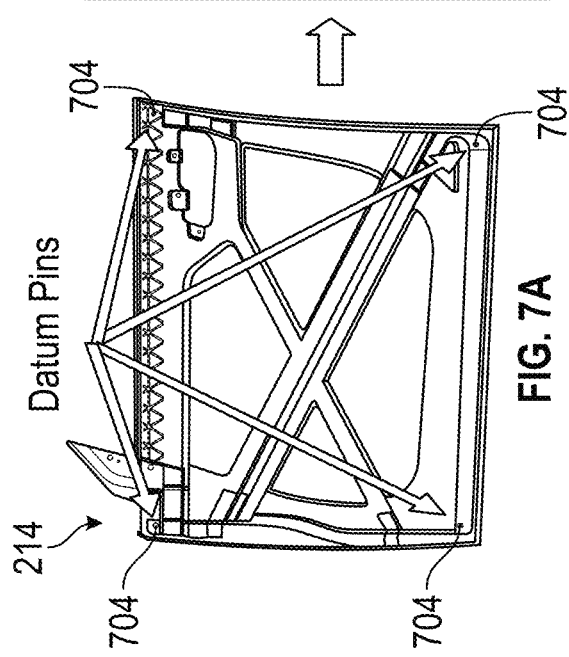
FIG. 7A
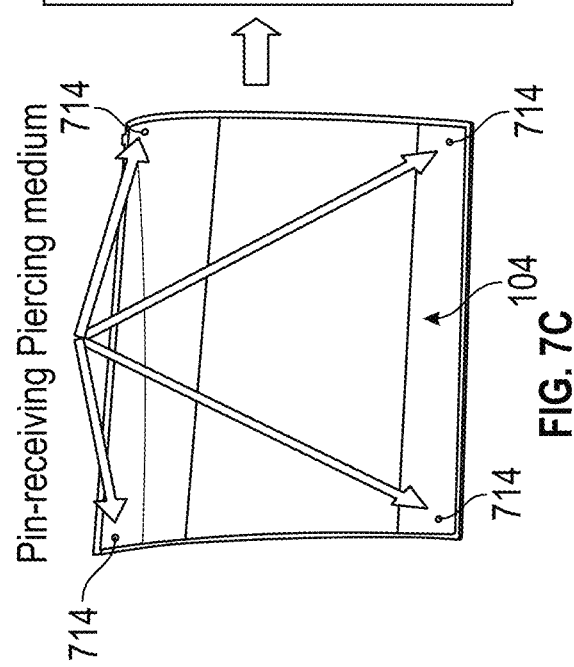
FIG. 7C
FIG. 7D

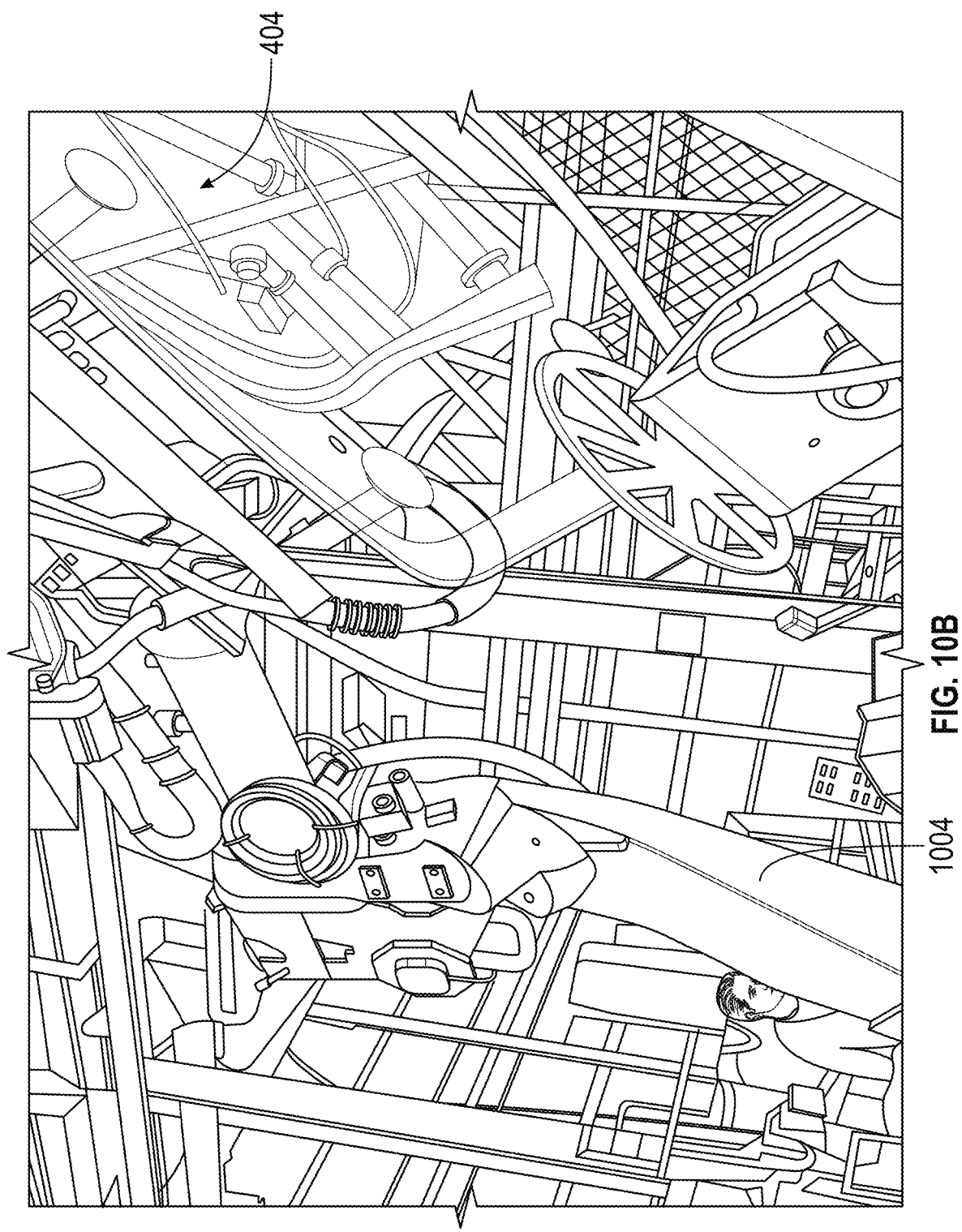

| | Traditional Hemmed | Perimeter Clipping | Discrete Clipping (No Flush Adjusting) | Discrete Clipping (Flush Adjusting) | Adhesive |
|---|---|---|---|---|---|
| Material Cost | $.29/m | $3.14/m | $.50/m | $1.79/m | $.41/m |
| Mass | 66.1g/m | 305.1g/m | 5.6g/m* | 43.9g/m* | 66.0g/m |
| Automation (GA) | 0 | - | - | - | + |
| Craftsmanship | 0 | 0 | 0 | + | + |
| Part Count | 0 | - | -- | -- | 0 |
| Serviceability | 0 | ++ | ++ | ++ | + |
| NVH | 0 | - | - | - | 0/+ |
| Sealing | 0 | - | - | - | 0 |

AUTOMATED EXTERIOR VEHICLE PART ASSEMBLY USING GLOBAL DATUM

TECHNICAL FIELD

The present disclosure relates to automated assembly technologies and specifically to the automated attachment and alignment of exterior vehicle parts and components using adhesives and datum referencing systems within manufacturing processes.

BACKGROUND

Traditional vehicle assembly methods often involve the construction of a vehicle body through the welding of stamped panels. After the body is constructed, it is transported through various systems such as e-coat and paint systems to provide corrosion resistance and the desired aesthetic finish. The painted body is then moved to a General Assembly (GA) shop where internal and external components are assembled. This process can lead to inefficiencies in material handling and transport, as the entire weight and footprint of the vehicle must be moved to assemble even small components. Additionally, this method can limit the ability to automate many manufacturing processes due to the difficulty and expense of locating and datuming the assembly at the full vehicle level.

The assembly of exterior vehicle components has traditionally involved a series of manual and semi-automated processes. These processes often require precise alignment and attachment of panels and parts to the vehicle's frame to ensure proper fit, finish, and function. The complexity of these tasks can lead to challenges in maintaining consistent quality and efficiency throughout the production line. Manufacturers have explored various methods to streamline these tasks, aiming to reduce the time and labor associated with vehicle assembly while maintaining high standards of quality and craftsmanship.

The integration of automation into assembly lines has been a focus of the industry, seeking to enhance production rates and reduce the potential for human error. Despite advancements in automation technology, the assembly of exterior vehicle components remains an area with unique challenges due to the variety of materials used, the need for precise alignment, and the requirement for durable and reliable attachment methods that can withstand the rigors of vehicle operation.

One of the key issues with traditional assembly methods is the potential for compounding errors. As each component is added to the vehicle, any slight misalignment or variance can add up, leading to larger discrepancies as the assembly process continues. This can be particularly problematic when it comes to ensuring even gaps and flushness between exterior panels, which are critical for both aesthetic and aerodynamic performance.

BRIEF SUMMARY

In seeking to address at least some of the challenges above, examples of the current disclosure utilize a global datum within an automated assembly cell. In some examples, the global datum is a singular or unique global datum.

This singular global datum serves as a universal reference point for the positioning and installation of all exterior parts. By using this method, each exterior panel is calibrated to the single datum, ensuring that every part is placed in its nominal position relative to its neighboring parts. In some examples, this approach effectively decouples the assembly processes and allows for the precise placement of exterior components without being affected by the tolerances of the underlying structure. The global datum ensures that the exterior fit is consistent and accurate, reducing the likelihood of error accumulation throughout the assembly process. The use of a global datum also facilitates the automation of the assembly process, as the robotic systems can reference this single point for all actions, leading to improved efficiency and repeatability.

Some examples thus seek to improve the way exterior vehicle components are assembled during the manufacturing process. This technology addresses the challenges of aligning and attaching parts such as doors, panels, and trim with high precision and consistency. Some examples seek to streamline the vehicle assembly process, enhance the quality of the final product, and increase the efficiency of production lines.

In described examples, a modular vehicle architecture allows for the assembly of a vehicle in sections, which are then joined in a final assembly operation. This approach eliminates the traditional need for welding stamped panels and applying secondary coatings or painting at the full vehicle assembly level. Instead, the vehicle can be constructed in parts, with metal surface treatments like e-coating and painting applied beforehand.

Some described examples utilize an automated assembly cell where each part to be installed has a corresponding fixture. These fixtures are designed to hold the parts in place, typically using a vacuum clamp and/or other clamping means while a structural adhesive is applied. The parts are then moved into nominal positions (described further below), compressing the structural adhesive and completing the exterior part installation. This method can help to ensure that the exterior parts are aligned correctly and attached securely.

One of the components of this technology is the use of a single global datum within the automated assembly cell. This global datum acts as a universal reference point for all parts, ensuring that each is installed in the correct position relative to the others. Example systems seek to enable the assembly of a vehicle with parts that fit together well every time, regardless of any irregularities or variances in the underlying structure.

Disclosed examples also incorporate an engineered adhesive gap that can compensate for substructure irregularities, effectively decoupling the tolerances of the underlying structure from the installed part location. This adhesive gap allows for compliance between adhered parts with high repeatability and accommodating differential heating or material properties without the need for additional components.

In some examples, different structural adhesive chemistries can be used to adjust the time it takes for the adhesive to set, or completion of an assembly process, and the final mechanical properties of the bond. Additionally, a tacking solution may be used concurrently with the structural adhesive to allow for immediate continued assembly while the primary adhesive cures. Examples of tacking solutions include self-piercing datums and quick-curing hot melt adhesives.

In some examples, self-piercing datums use a ridged datum pin that can be pushed into a piercing medium such as a compliant foam or other substrate during installation to fix the exterior part into position before the structural adhesive has cured. In some examples, these datum pins have additional profile features to ensure positive retention. The datum pins may also be heated before installation to increase the range of applicable substrate materials.

In some examples, hot melt adhesives are applied locally, either concurrently or in quick succession, to the primary adhesive. They cool faster than the primary adhesive cures, which allows for an accelerated takt time. This means that the next vehicle can move through the assembly cell more quickly (lower takt time), thereby increasing the overall production rate.

Because of the tight tolerances related to the exterior vehicle parts, such as body panels, installed using this technology, additional part installation can be automated without the need to dimensionally evaluate each vehicle. This repeatable tight tolerancing can further enhance the efficiency of the vehicle assembly process.

Some examples also address the issue of serviceability. By using adhesives and fixtures to attach exterior parts, the need for traditional fasteners and clips is reduced or eliminated. This can simplify the process of servicing or replacing parts, as there are fewer components to remove and reinstall.

In summary, described examples seek to provide a method for assembling exterior vehicle components that is more efficient and produces a higher quality product than traditional methods. By using an automated assembly cell with a global datum and advanced adhesive technologies, this method seeks to enable a precise and consistent placement of parts, reducing the potential for errors and improving the overall efficiency of the vehicle assembly process.

BRIEF DESCRIPTION OF THE DRAWINGS

Throughout the drawings, reference numbers may be re-used to indicate correspondence between referenced elements. The drawings are provided to illustrate examples of the subject matter described herein and not to limit the scope thereof.

FIG. 4C demonstrates the movement of exterior vehicle parts into respective nominal positions with reference to the global datum, compressing the structural adhesive to adhere the parts to the vehicle assembly structure, according to some examples.

FIG. 7A-FIG. 7E depict example tacking operations in an assembly process, including the use of datum pins and a tacking applicator for fixing exterior vehicle parts in their nominal positions before the structural adhesive has cured, according to some examples.

FIG. 10A-FIG. 10D show various stages in the framing station of an automated assembly cell, including the application of structural adhesive, assembly of exterior vehicle parts, and clipping of interlocking panels, according to some examples.

DETAILED DESCRIPTION

Figure 1:
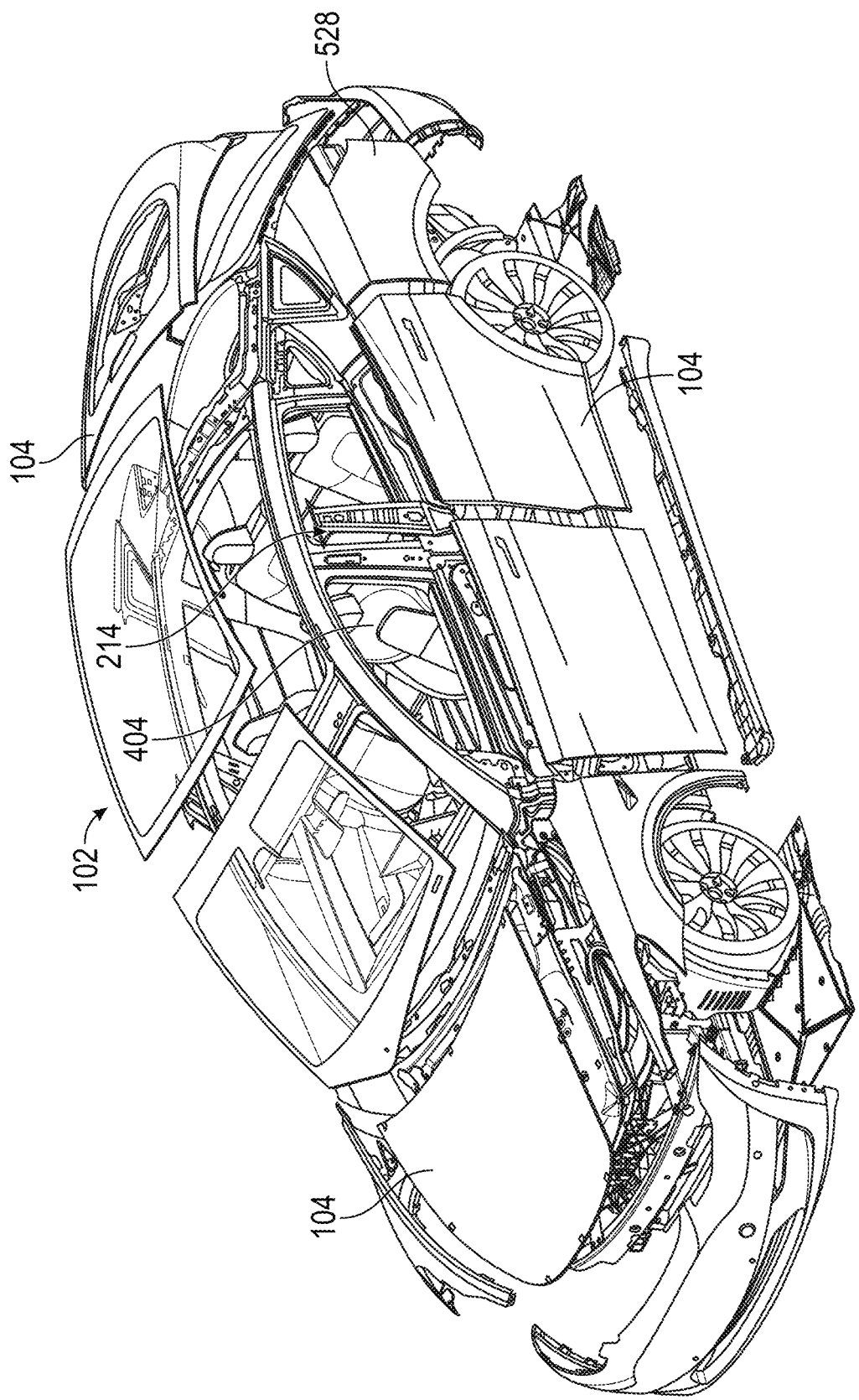
FIG. 1 is an illustration depicting an example vehicle assembly structure and associated components, according to some examples.

Some examples provide an automated attachment system of vehicle exteriors wherein multiple exterior vehicle parts, such as panels and glazing, are located and installed into a vehicle assembly structure referencing a single or unique global datum. Each part to be installed has a corresponding fixture within an automated assembly cell. The parts are secured to their respective fixtures by vacuum clamp and/or other clamping means.

A structural adhesive is dispensed either to the clamped part or to a part-receiving location or zone on the vehicle assembly structure. With reference to the global datum, the parts are moved into their respective nominal positions, and in so doing compress the structural adhesive to adhere the part to the vehicle assembly structure and complete installation of the part thereto. In some examples, the term "nominal position" refers to the intended or designed position of a part within a larger assembly or system. In the context of manufacturing and engineering, it is the precise location where a component should be placed according to the design specifications. This position is determined by the design of the product (e.g., a vehicle) and is used as a reference point assessed against the global datum during the assembly process to ensure that each part is installed correctly.

In some examples, when a part is in its nominal position, it means that it is aligned and oriented precisely per specification (for example, as planned by a vehicle designer or engineer). This precise placement helps to ensure that the part will function as intended and that the overall assembly will have the correct form, fit, and function. Secure repeatable assembly of an exterior vehicle part in a nominal position can be critical for maintaining the quality and performance of the final vehicle, as deviations from this position can lead to issues such as improper fit, panel gaps, interference with other components, or compromised structural integrity.

In some examples, an engineered adhesive gap compensates for substructure irregularities, decoupling underlying structure tolerances from installed part location. This assembly architecture allows for as-designed gap and flush specifications for every part with high repeatability. Additionally, the adhesive gap allows for compliance between adhered parts, inherently compensating for differential heating or material properties without additional parts. Different primary adhesive chemistries can be used to adjust takt time and final mechanical properties.

A tacking solution may be used concurrently with application of the primary adhesive to allow immediate continued assembly while the primary adhesive cures. The tacking solutions may include self-piecing datums and hot melt adhesives. In some examples, a self-piercing datum pin includes a ridged datum pin to push into a compliant foam or other substrate during installation to fix the part into its nominal position before final adhesive has cured. In some examples, the pins have additional profile features to assure positive retention. The piercing pins may also be heated before installation to increase the range of applicable substrate materials. In some examples, a hot melt adhesive is locally applied concurrently or in quick succession to the structural adhesive. The hot melt adhesive cools faster than the primary adhesive cures, allowing for accelerated takt time.

Additional parts may be interfaced to the automated adhered panels downstream. Because of the tight tolerances related to such panels, additional part installation can be automated without need to dimensionally evaluate each vehicle.

FIG. 1 shows a pictorial view of an example vehicle assembly structure 102. The vehicle assembly structure 102 may include one or more body frames 214, such as a door inner or a hood inner, for example. Further examples of a body frame 214 forming part of a vehicle assembly structure 102 are provided further below. The one or more body frames 214 may be pre-assembled to the vehicle assembly structure 102, in accordance with some examples described herein. One or more exterior vehicle parts 104 are assembled to the vehicle assembly structure 102 as described further below in some examples. An example exterior vehicle part 104 may include a quarter panel 528 or glazing 404, for example. The one or more exterior vehicle parts 104 may be assembled to the one or more body frames 214 of the vehicle assembly structure 102.

Figure 2:
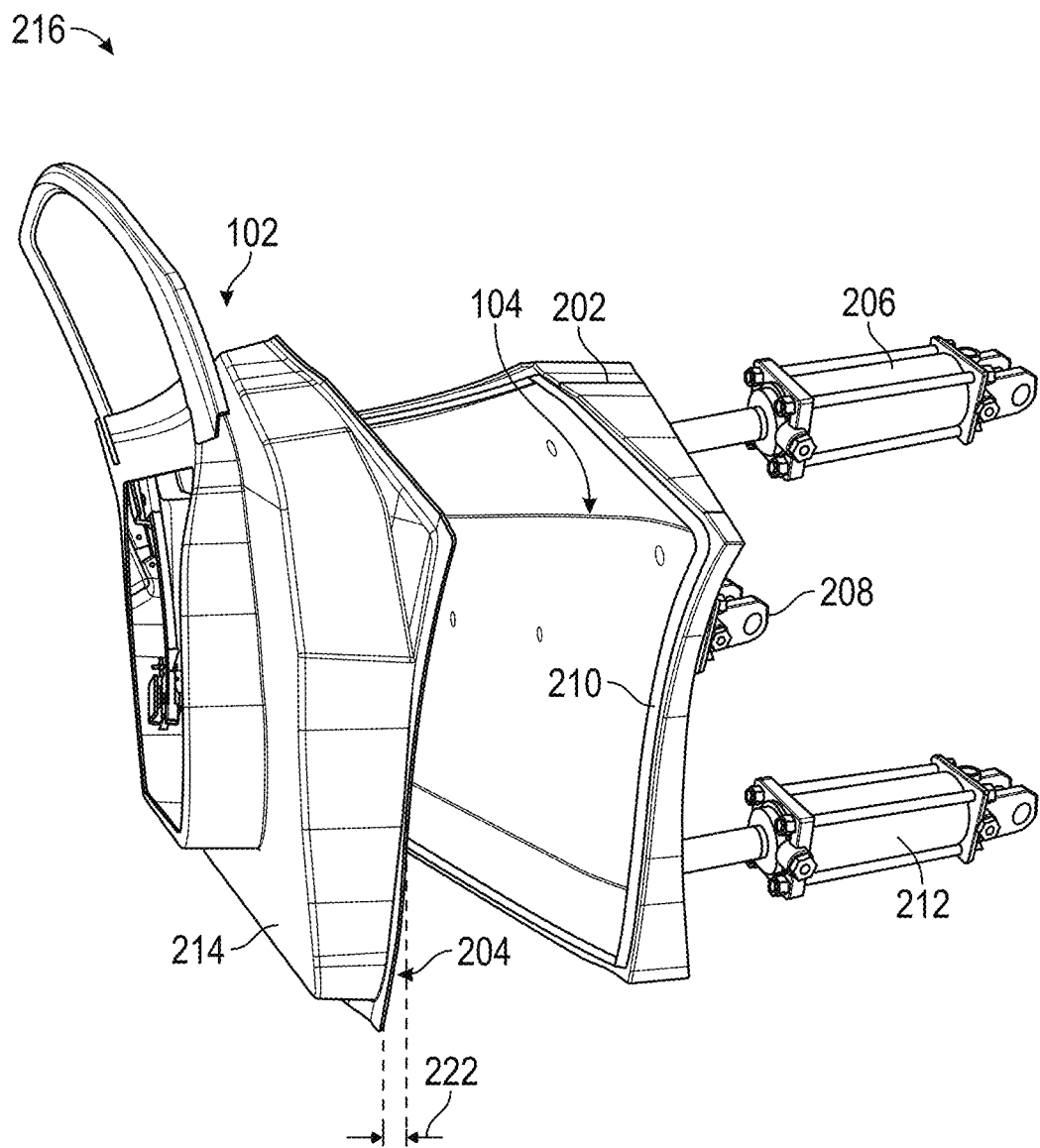
FIG. 2 provides pictorial views of example components of a system for attaching exterior vehicle parts to a vehicle assembly structure, including a fixture corresponding to an exterior vehicle part, according to some examples.

FIG. 2 shows pictorial views of some example components of a system for attaching exterior vehicle parts to a vehicle assembly structure 216. The example components include a fixture 202. The fixture 202 is shaped and configured as shown (for example) so that at least one surface or dimension corresponds precisely to an exterior vehicle part such as the illustrated exterior vehicle part 104 (here an exterior door panel, also known as a door outer). The exterior vehicle part 104 is fitted to the body frame 214 (in this case a door frame, also known as a door closure, or a door inner) of the vehicle assembly structure 102. In some examples, the body frame 214 has been pre-assembled to the vehicle assembly structure 102.

The exterior vehicle part 104 is secured to a respective fixture 202 using a vacuum clamp 208, or other clamping means 206, such as a mechanical clamp (not visible) attached to the end of a hydraulic ram, or a magnet on a robot arm, for example. Other methods and/or means for securing the exterior vehicle part 104 to the fixture 202 are possible. In some examples, each of the exterior vehicle parts 104 of a vehicle 406 (for example FIG. 4A below) may be provided with a respective fixture 202 shaped and configured to accept the relevant exterior vehicle part 104 in a secure manner in example methods of attaching exterior vehicle parts to a vehicle assembly structure.

In some examples, a structural adhesive 210 is applied to the secured exterior vehicle part 104 or to a part-receiving location 306 on a fixture 202 (see FIG. 3B below for example). The secured exterior vehicle part 104 (door panel) can be moved into a respective nominal position (for example, a nominal position 204 located against the door panel as shown) relative to a single or unique global datum (see global datum 402 in FIG. 4B for example) by a positioning mechanism 212 to compress the structural adhesive 210 and complete installation of the exterior vehicle part 104 to the vehicle assembly structure 102, or in this case to the body frame 214 (door frame).

In some examples, a chemistry of the structural adhesive 210 is selected to adjust a vehicle assembly takt time (a time taken to complete an assembly phase in an automated assembly cell, or to move between automated assembly cells), or to adjust a final mechanical property or curing time of an adhesive bond between an exterior vehicle part 104 and the vehicle assembly structure 102 or body frame 214. In some examples, the structural adhesive 210 includes a urethane or polyurethane material.

In some examples, an adhesive gap 222 is provided in the bonding path of an exterior vehicle part 104 to a body frame 214 to compensate for structural or other irregularities. Irregularities may be present at one or more points in in an entire assembly system (such as the system for attaching exterior vehicle parts to a vehicle assembly structure 216), and/or in an exterior vehicle part (such as the exterior vehicle part 104), and/or in a fixture (such as the fixture 202), and/or in a substructure (such as the body frame 214) of a vehicle assembly structure (such as the vehicle assembly structure 102). In some examples, the adhesive gap 222 accommodates for differential heating or material properties between an exterior vehicle part 104 and a fixture 202, and/or between an adhered exterior vehicle part 104 and a vehicle assembly structure 102 or body frame 214. In some examples, for example as illustrated, the adhesive gap 222 is provided adjacent a nominal position 204 of an exterior vehicle part 104 an/or a body frame 214. Other positions of the adhesive gap 222 are possible. In some examples, the adhesive gap 222 is positioned at or over a nominal position 204, or at least includes the nominal position 204 in a width of the adhesive gap 222 or a bead of the structural adhesive.

Thus, in broad aspects, a method of attaching exterior vehicle parts to a vehicle assembly structure is provided. An example method includes providing an automated assembly cell having one or more fixtures, with each fixture corresponding to an exterior vehicle part; referencing a global datum for aligning the exterior vehicle parts within the automated assembly cell; securing an exterior vehicle part to a respective fixture using vacuum clamp or other clamping means; applying a structural adhesive to a secured exterior vehicle part or to a part-receiving location on the vehicle assembly structure; and moving the secured exterior vehicle part into a respective nominal position relative to the global datum to compress the structural adhesive and complete installation of the exterior vehicle part to the vehicle assembly structure.

In some examples, the part-receiving location is included in or on a body frame of the vehicle assembly structure. In some examples, the exterior vehicle parts are moved serially into their respective nominal positions relative to the global datum. In some examples, at least some of the exterior vehicle parts are moved concurrently or part-concurrently into their respective nominal positions relative to the global datum. In some examples, the respective nominal position is or corresponds to an intended or final position of the exterior vehicle part within the vehicle assembly structure as determined by a design specification.

Figure 3A:
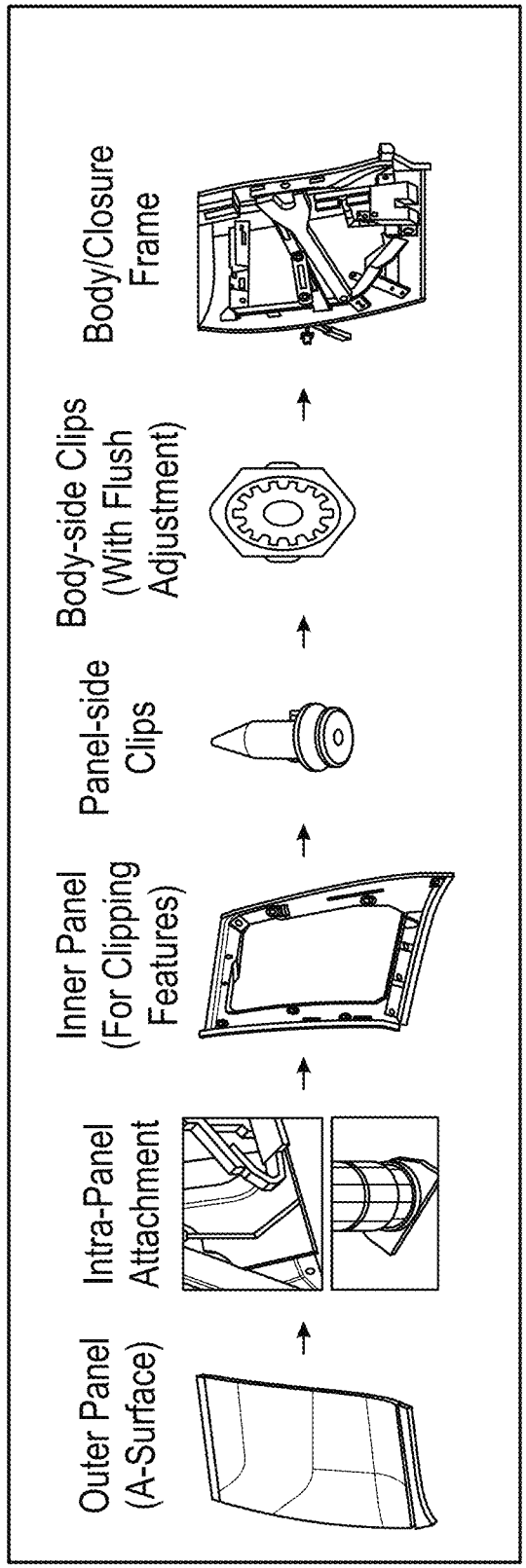
FIG. 3A illustrates certain disadvantageous aspects and/or complications of traditional exterior vehicle part assembly techniques, according to some traditional examples.

Some further examples include providing an adhesive gap to compensate for irregularities in an exterior vehicle part, a fixture, or a substructure of the vehicle assembly structure. Some examples further include selecting a structural adhesive chemistry to adjust a vehicle assembly takt time or a final mechanical property of an adhesive bond between an exterior vehicle part and the vehicle assembly structure or body frame. In some examples, the structural adhesive includes urethane or polyurethane. In some examples, the adhesive gap accommodates differential heating or material properties between an adhered exterior vehicle part and the vehicle assembly structure, or between an exterior vehicle part and a body frame. Other technical features may be readily apparent to one skilled in the art from the following figures, descriptions, and claims. FIG. 3A shows certain challenges and/or complications of traditional exterior vehicle part assembly techniques. For example, an outer panel (such as an A surface) is sourced and enters a separate panel assembly line. The outer panel typically requires one or more intra-panel attachments to an inner panel. To this end, the inner panel is provided with clipping features. Panel side clips and body-side clips (for example, as shown) are required and each clip has to be separately installed in what can be a painstaking and/or time-intensive manner. The assembled inner and outer panels are then mounted to a body closure or frame, as shown. These exterior part assembly operations can require a number of relatively complicated steps.

Figure 3B:
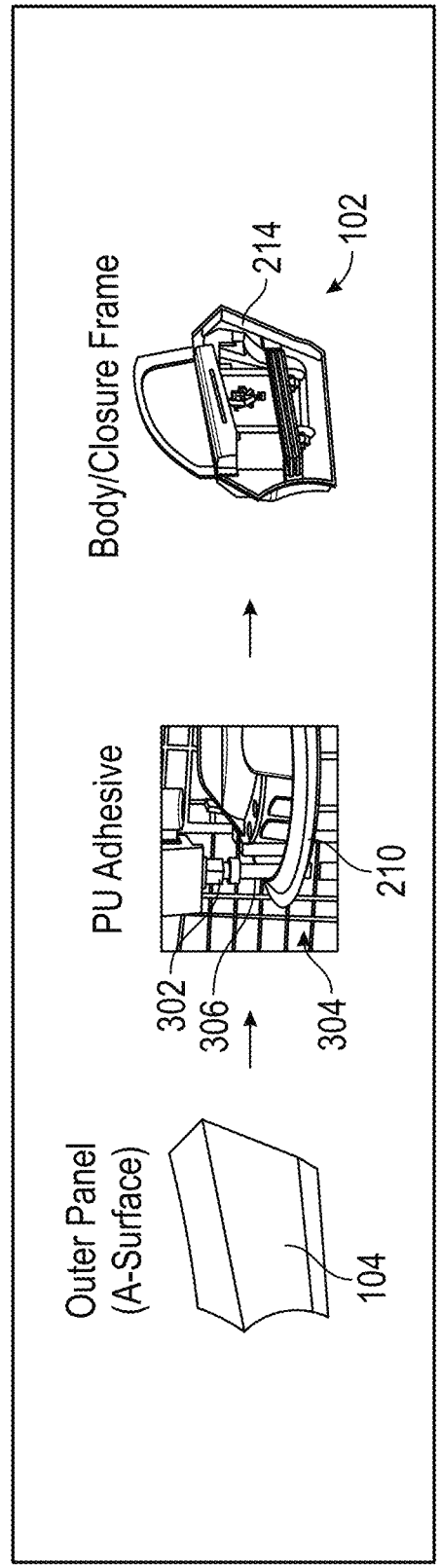
FIG. 3B shows (for comparison) aspects of a simplified process of adhering an exterior vehicle part to a vehicle assembly structure using an automated assembly cell and structural adhesive, according to some current examples.

On the contrary, and as shown in FIG. 3B, viewed broadly some example methods of this disclosure include a more efficient process of exterior vehicle part assembly. Some examples adhere an exterior vehicle part 104 to a vehicle assembly structure 102 or body frame. The vehicle assembly structure 102 may include a pre-assembled body frame 214 to which the exterior vehicle part 104 is adhered. The operations of adhering the exterior vehicle part 104 to the vehicle assembly structure 102 (or body frame 214) may include (as shown) use of a dispensing mechanism 302 to dispense the structural adhesive 210 at a part-receiving location 306 or to an exterior vehicle part 104 in an automated assembly cell 304.

Figure 4A:
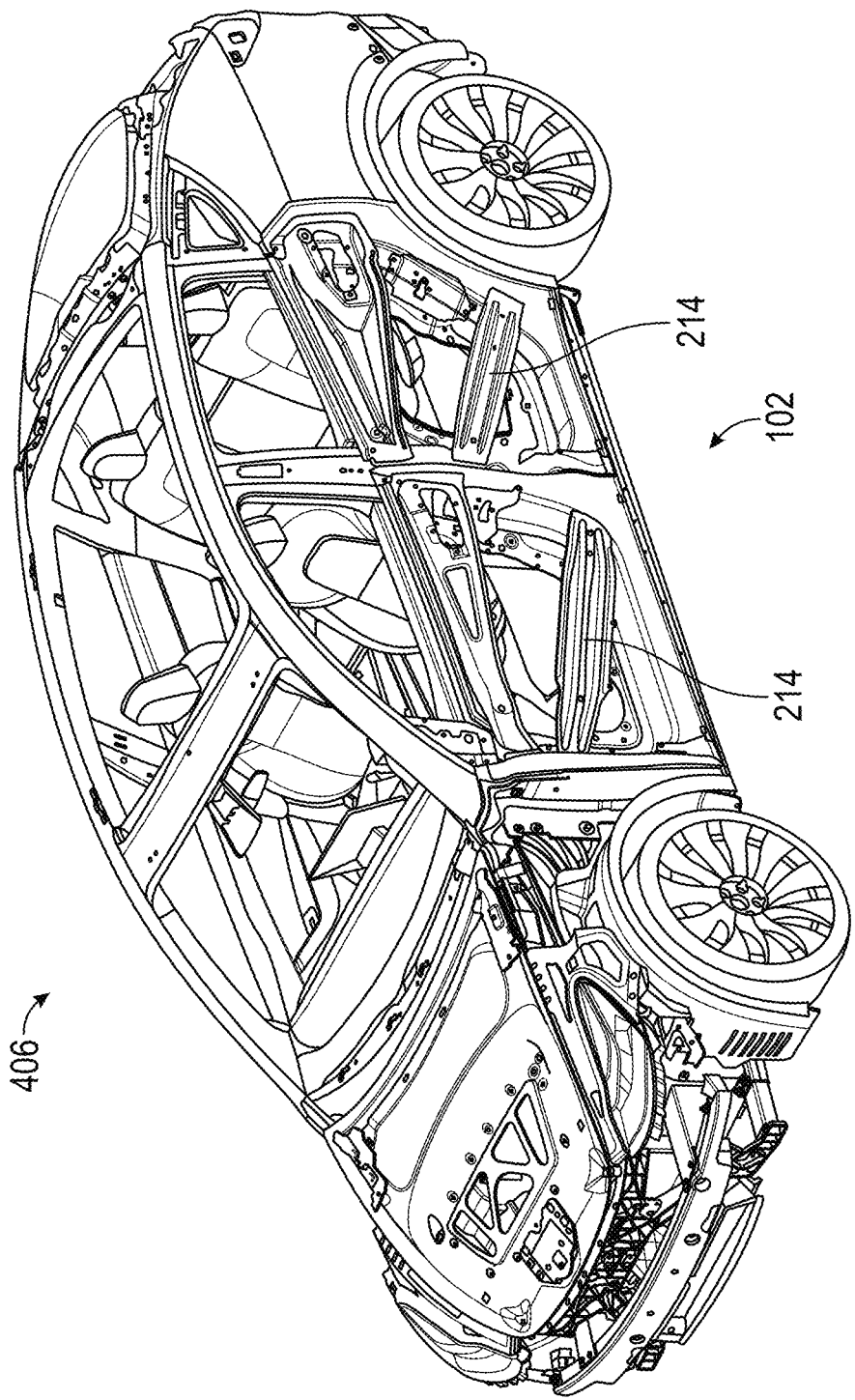
FIG. 4A depicts a nearly complete vehicle excluding exterior panels, showing a vehicle assembly structure ready for the addition of exterior vehicle parts, according to some examples.

In FIG. 4A, a nearly complete vehicle 406 excluding exterior panels is shown. In this form, the vehicle includes, or is comprised by, a vehicle assembly structure 102. The vehicle assembly structure 102 may include one or more body frames 214, as shown. In some examples, the one or more body frames 214 are pre-assembled into the vehicle assembly structure 102, or at least form part of the vehicle assembly structure 102 before the vehicle assembly structure 102 is moved into an exterior part fixture station, or automated assembly cell 304, as shown in FIG. 4B.

Figure 4B:
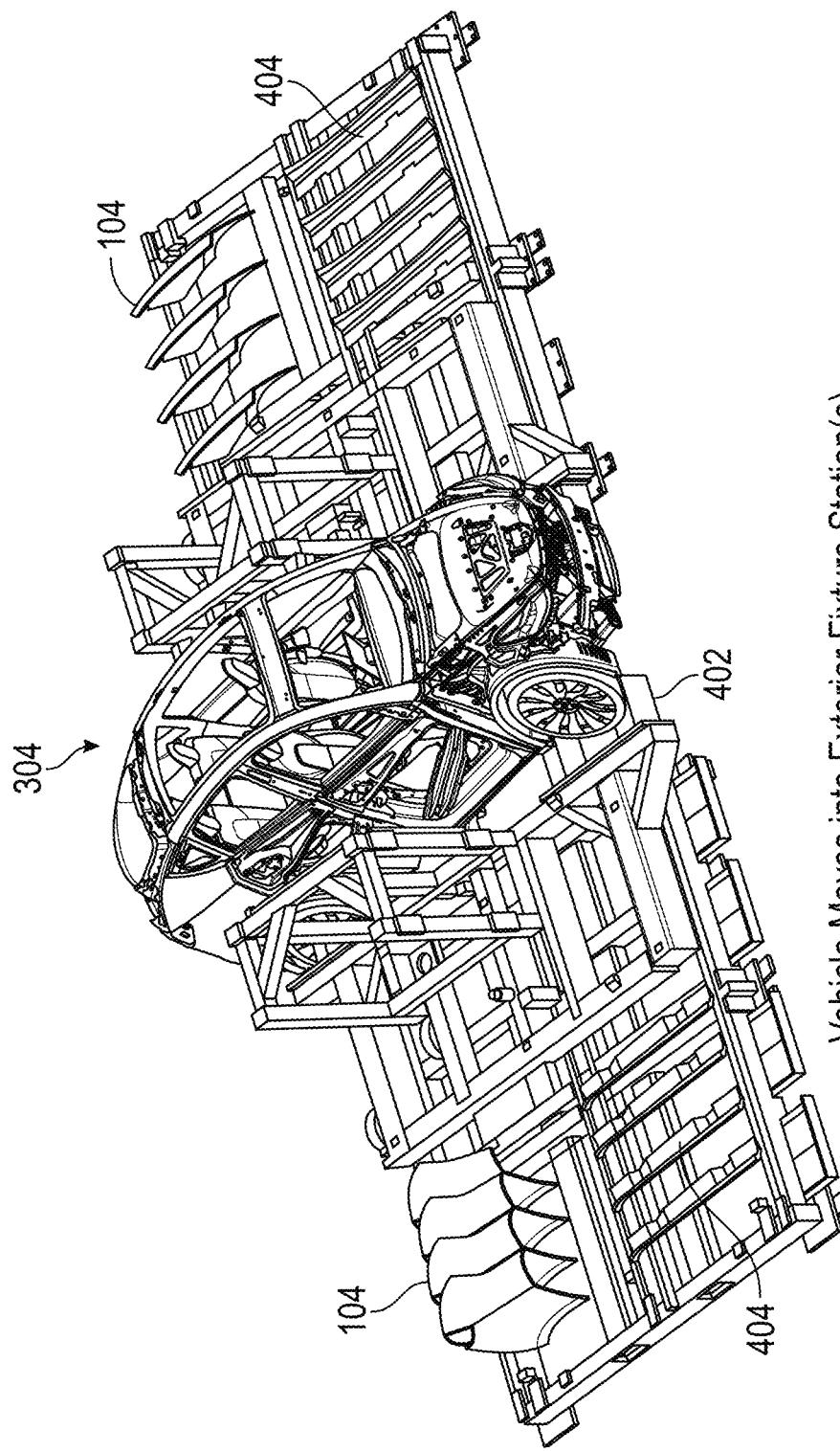
FIG. 4B illustrates an automated assembly cell with an array of exterior vehicle parts and vehicle glazing positioned adjacent to a robot, with a global datum for alignment, according to some examples.

In FIG. 4B, an array of exterior vehicle parts 104 and/or panes of vehicle glazing 404 are shown adjacent and in reach of a robot of the automated assembly cell 304. The automated assembly cell 304 includes a global datum 402 for aligning the exterior vehicle parts 104 and/or the glazing 404 within the automated assembly cell 304. The global datum 402 may be defined by a structure of the automated assembly cell 304, or by a reference mechanism, or by a virtual point or structure relative to the automated assembly cell 304.

As noted above, a structural adhesive 210 is dispensed either to a vacuum clamped exterior vehicle part 104 or to a part-receiving location 306 or zone on the vehicle assembly structure 102. In FIG. 4C, with reference to the global datum 402, each of the exterior vehicle parts 104 is moved into its respective nominal position in the manner described above, and in so doing compress the structural adhesive 210 to adhere the exterior vehicle part 104 to the vehicle assembly structure 102 (or a body frame 214 or closure, in some examples) and complete installation of the part thereto.

In some examples, the exterior vehicle parts 104 are moved serially into their respective nominal positions relative to the global datum 402. In some examples, at least some of the exterior vehicle parts 104 are moved concurrently or part-concurrently into their respective nominal positions relative to the global datum 402.

In some examples, the term "nominal position" refers to the intended or designed position of a part within a larger assembly or system. In the context of manufacturing and engineering, it is the precise location where a component should be placed according to the design specifications. This position is determined by the design of the product (e.g., a vehicle) and is used as a reference point assessed against the global datum during the assembly process to ensure that each part is installed correctly. In some examples, when a part is in its nominal position, it means that it is aligned and oriented precisely per specification, for example as planned by a vehicle designer or engineer. This precise placement helps to ensure that the part will function as intended and that the overall assembly will have the correct form, fit, and function. The nominal position can be critical for maintaining the quality and performance of the final product, as deviations from this position can lead to issues such as improper fit, interference with other components, or compromised structural integrity.

In some examples, an engineered adhesive gap (such as the adhesive gap 222) is used in one or more of the part-fixing operations of FIG. 4C. The engineered adhesive gap compensates for substructure irregularities, thereby decoupling underlying structure tolerances from installed part location. In some examples, this assembly architecture allows for as-designed gap and flush specifications for every part with high repeatability. Additionally, the adhesive gap allows for compliance between adhered parts, inherently compensating for differential heating or material properties without additional parts. Different primary adhesive chemistries can be used to adjust takt time and final mechanical properties.

Figure 4E:
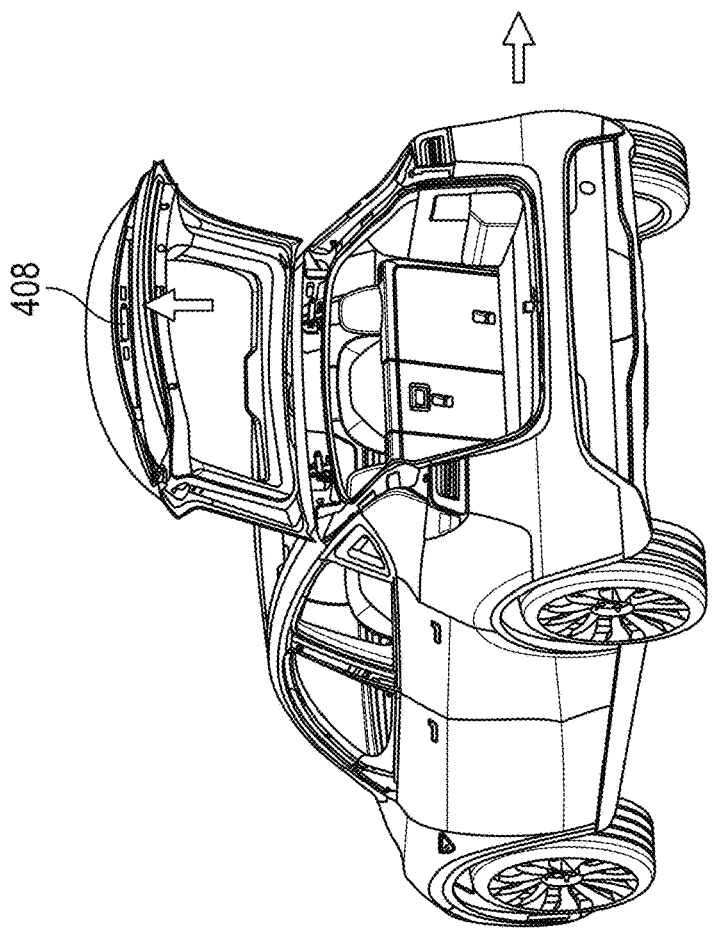
FIG. 4E depicts a process of making exterior-facing electrical connections and applying trim close-outs, according to some examples.
Figure 4D:
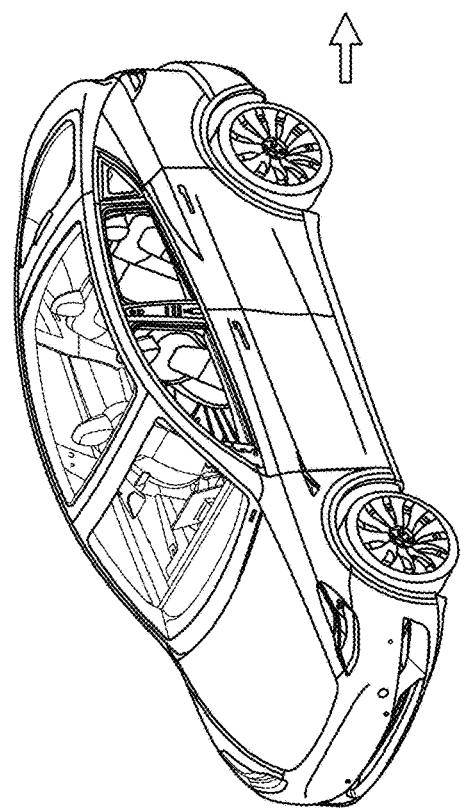
FIG. 4D shows a vehicle with assembled exterior vehicle parts exiting the automated assembly cell, according to some examples.
Figure 4F:
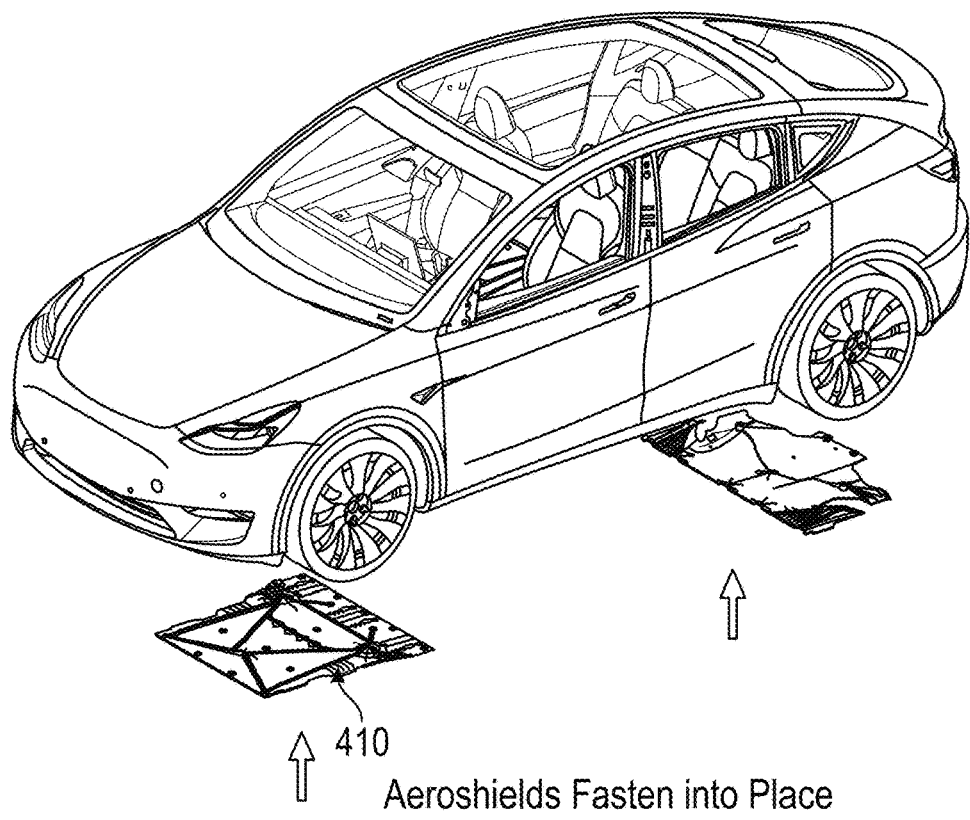
FIG. 4F illustrates an application of aero-shields to complete an assembly stage of the vehicle, according to some examples.

In FIG. 4D, the vehicle 406, including the vehicle assembly structure 102 to which the exterior vehicle parts 104 have been fitted, leaves the automated assembly cell 304. In FIG. 4E, one or more exterior-facing electrical connections 408 are made and one or more trim close-outs are applied in some examples. In FIG. 4F, in some examples, one or more aero-shields 410 are applied to complete the assembly (or at least an assembly stage) of the vehicle 406.

Figure 5A:
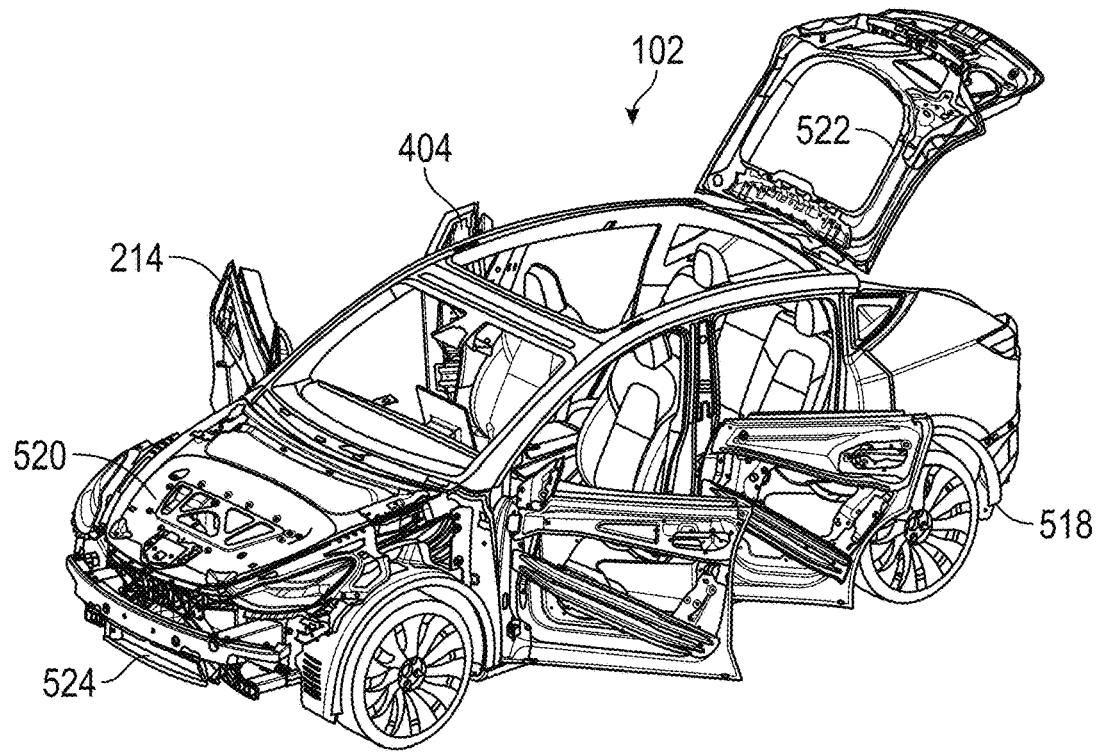
FIG. 5A-FIG. 5C represent a sequence of automated assembly cells in a vehicle assembly line, detailing example stages of preassembly, installation of exterior vehicle parts, and installation of downstream exterior vehicle parts, respectively, according to some examples.
Figure 5B:
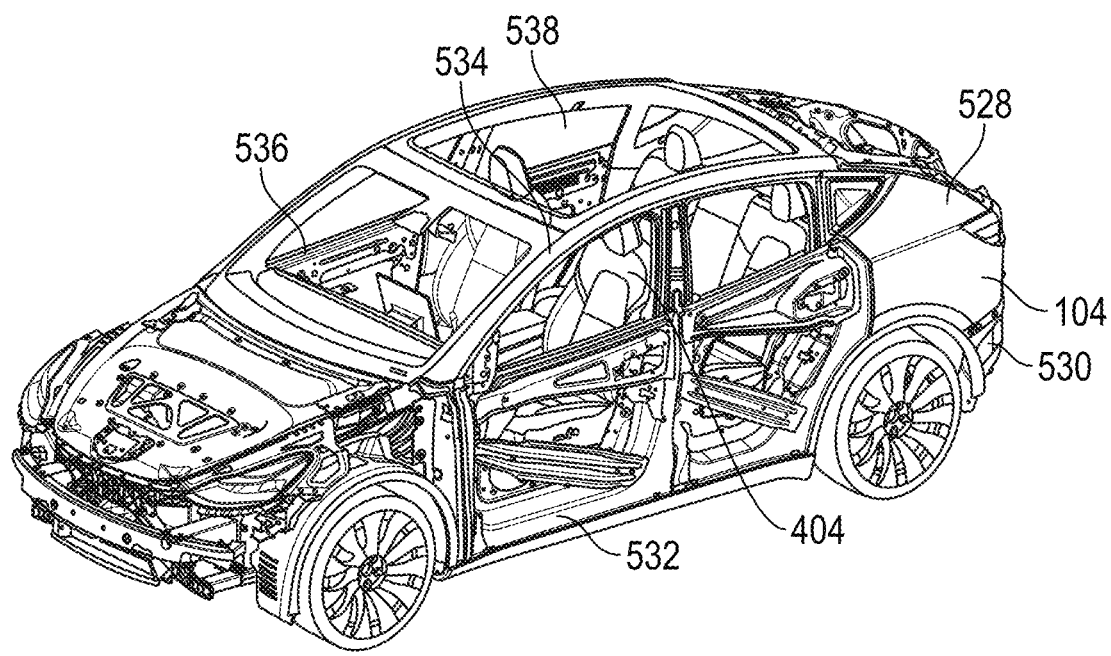
Figure 5C:
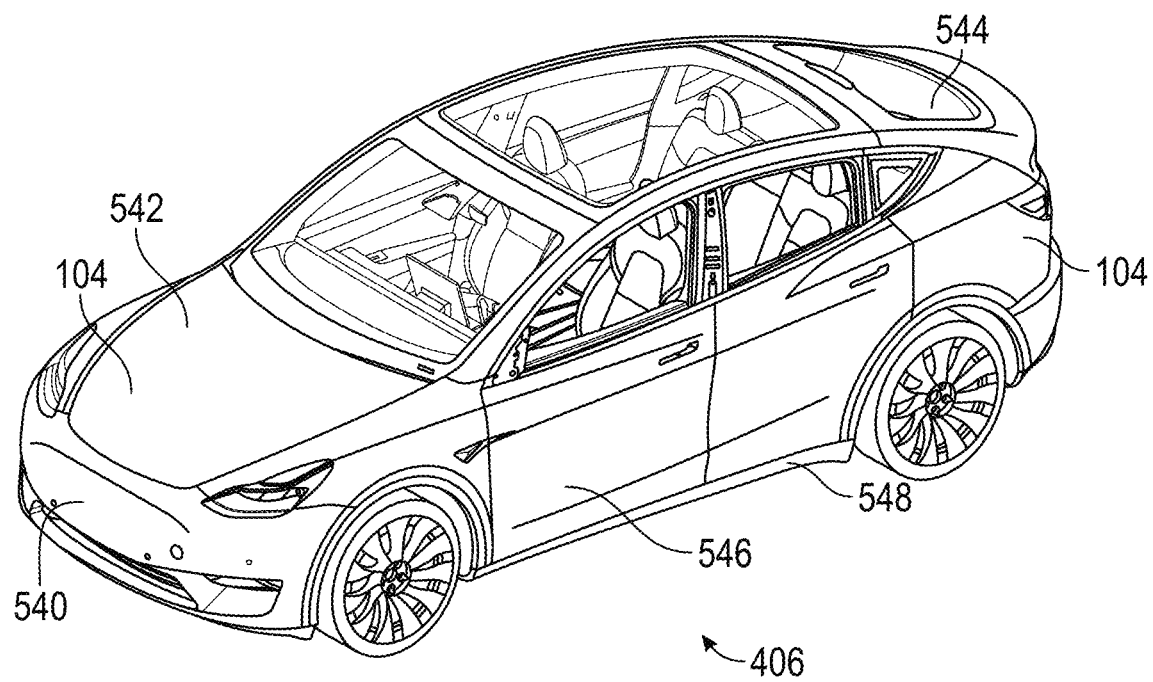

In FIG. 5A-FIG. 5C one or more automated assembly cells 304 may be provided in a vehicle assembly line comprising a system for attaching exterior vehicle parts to a vehicle assembly structure 216. FIG. 5A may include a preassembly stage performed within an automated assembly cell 304, or manually outside an automated assembly cell 304, in which example body frame 214 is preassembled to a vehicle assembly structure 102. Example body frames 214 may include one or more of a body frame 214 (such as a door inner, or door closure), a wheel liner 518, a hood inner 520, a trunk inner 522, and a front end carrier 524.

In FIG. 5B, a further (or first) automated assembly cell 304 installs exterior vehicle parts 104 to the vehicle assembly structure 102, more specifically to one or more of the body frames 214 of the vehicle assembly structure 102. Example exterior vehicle parts 104 may include a panel of vehicle glazing 404, a quarter panel 528, a rear fascia 530, a shut face 532 (or door sill), a cant rail 534, a windscreen 536, and a roof 538.

In FIG. 5C, a further (or second) automated assembly cell 304 installs further or downstream exterior vehicle parts 104 to the vehicle assembly structure 102 and/or a body frame 214 thereof. Example downstream exterior vehicle parts 104 may include one or more of front fascia 540, a hood outer 542, a tailgate outer 544, a door skin 546, and a rocker 548.

In a post-assembly stage, one or more electrical wiring or harness connections (such as exterior-facing electrical connections 408) may be made, wiper blades fitted, and one or more aero-shields 410 installed. Other post-assembly stages or operations are possible.

Figure 6:
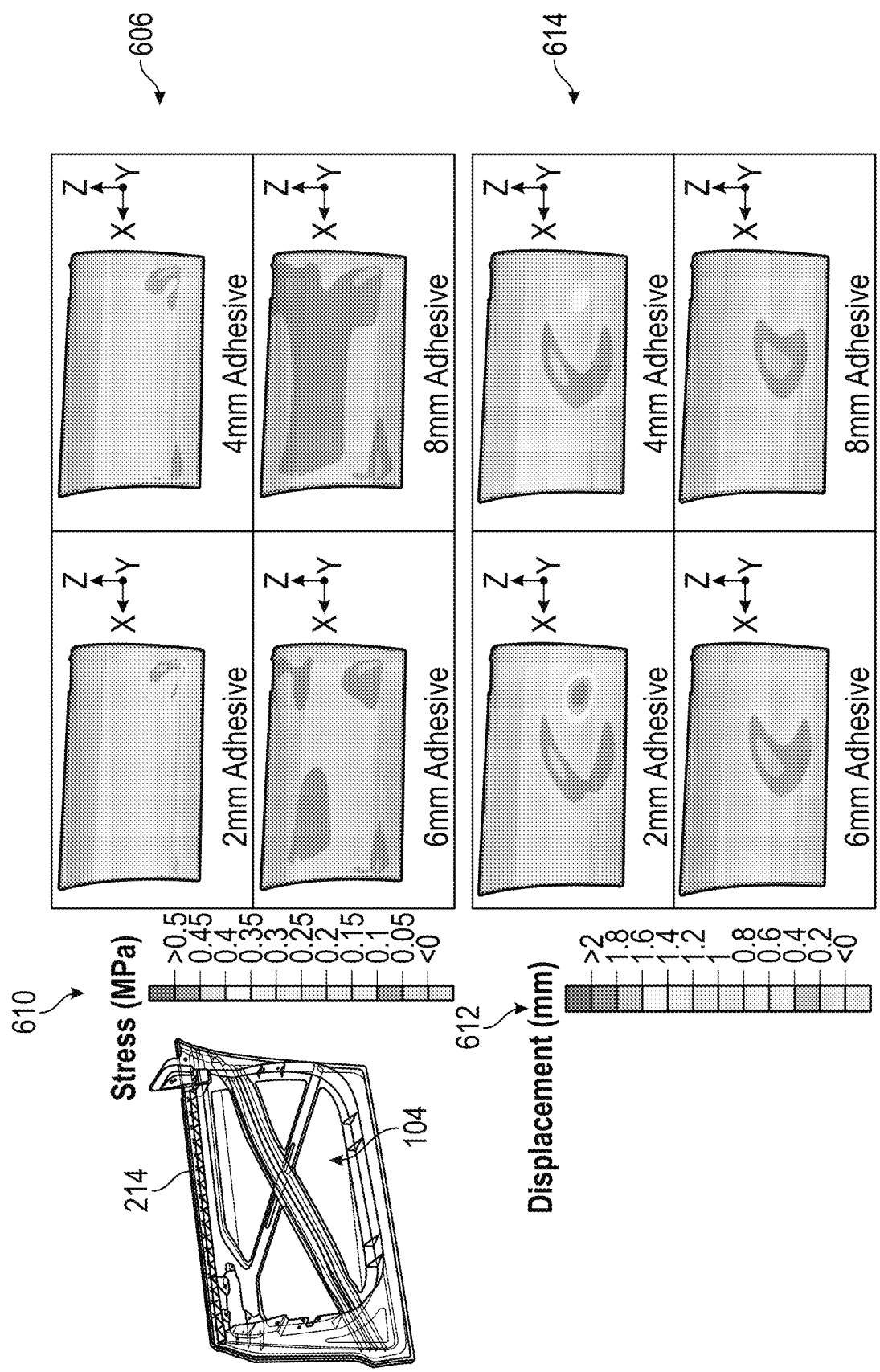
FIG. 6 presents stress and displacement figures for an exterior vehicle part, specifically a plastic door panel, when adhesively bonded to an aluminum frame using various thicknesses of urethane structural adhesive, according to some examples.

FIG. 6 shows examples of stress and displacement figures for an exterior vehicle part, in this case a plastic door panel, adhesively bonded to an aluminum frame (as an example body frame 214 of a vehicle assembly structure 102), using various example thicknesses of urethane structural adhesive 210. The door panel was adhered to the aluminum frame using a fixture and structural adhesive as described further above using an automated assembly cell 304.

The structural adhesive 210 applied to adhere the door panel to the aluminum frame was dispensed in varying test thicknesses of 2 millimeters (mm), 4 mm, 6 mm, and 8 mm yielding example door panel stresses (in MPa) as shown in the respective stress value distribution charts 606, and displacements or deformation (in mm) as shown in the respective displacement value distribution charts 614. Values for the stress and displacement distributions are given in the respective stress scoring bar 610 and displacement scoring bar 612.

It will be seen that displacement (or deformation) of a door panel (as an example exterior vehicle part 104) when assembled to an aluminum frame (as an example part of a vehicle assembly structure 102) is barely discernible when using methods of the current disclosure. Applied stresses are relatively mild. This lack of deformation and stress can be an important factor in promoting consistent and repeatable accuracy in panel and exterior vehicle part placement on a vehicle.

FIG. 7A-FIG. 7E depict example tacking operations in an assembly process, including the use of datum pins and a tacking applicator for fixing exterior vehicle parts in their nominal positions before the structural adhesive has cured, according to some examples.

Examples of tacking solutions include self-piercing datums and/or quick-curing hot melt adhesives. In some examples, self-piercing datums use a ridged datum pin that can be pushed into a piercing medium such as a compliant foam or other substrate during installation to fix the exterior part into position before the structural adhesive has cured. In some examples, these datum pins have additional profile features to ensure positive retention. The datum pins may also be heated before installation to increase the range of applicable substrate materials.

Figure 8A:
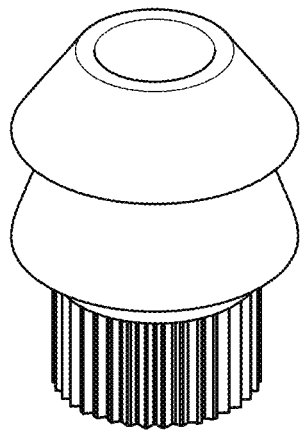
FIG. 8A-FIG. 8C show various views of an example datum pin in the form of a ridged datum pin, according to some examples.
Figure 8B:
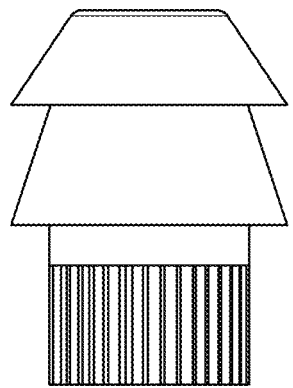
Figure 8C:
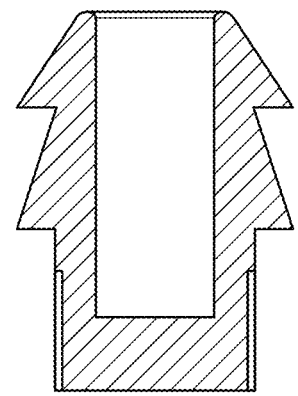

As shown in the views of FIG. 7A-FIG. 7E, one or more datum pins 704 are provided at securing locations on a body frame 214, such as a door inner or door closure. A datum pin 704 may be provided as shown in the form of a ridged datum pin 710, seen more clearly in the enlarged views of FIG. 8A-FIG. 8C, for example. Other types of datum pins are possible, such as a self-piercing datum pin 902 shown in FIG. 9, for example. A ridged datum pin 710 and/or a self-piercing datum pin 902 on a body frame 214 may engage with an exterior vehicle part 104, or vice versa. In some examples, a ridged datum pin 710 and/or a self-piercing datum pin 902 provided on a body frame 214 may be received in a piercing medium 714 provided on an exterior vehicle part 104 (such as door panel, FIG. 7A for example) to enable continued assembly of the vehicle assembly structure pending a curing of the structural adhesive. Other tacking configurations are possible. In some examples, a tacking operation includes an application of one or more datum pins to the exterior vehicle part or the vehicle assembly structure to fix a tacked exterior vehicle part in its nominal position before the structural adhesive has cured.

Figure 9:
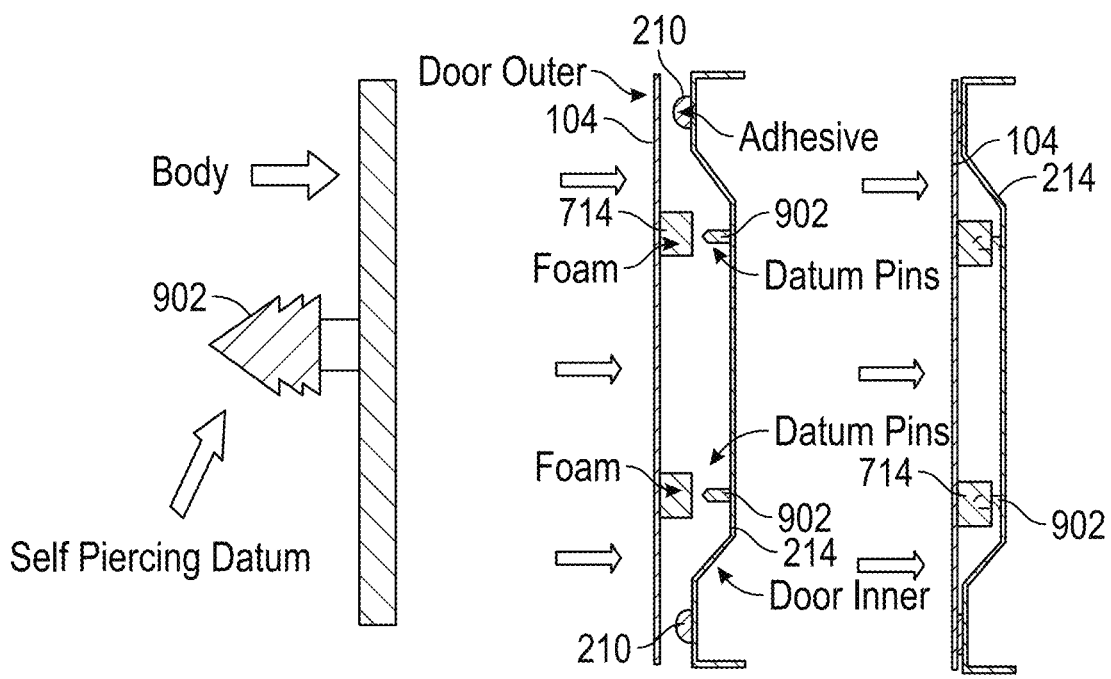
FIG. 9 depicts further example tacking operations in an assembly process, including the use of datum pins for fixing exterior vehicle parts in their nominal positions before the structural adhesive has cured, according to some examples.

As shown in FIG. 9, one or more self-piercing datum pins 902 provided on a door inner (as an example body frame 214) by a tacking applicator are each received in a corresponding piercing medium 714, such as a compliant foam, provided on a door outer (as an example exterior vehicle part 104) to enable continued assembly of the vehicle assembly structure 102 structure pending a curing of the structural adhesive. Enabling continued assembly of the vehicle assembly structure 102 structure pending a curing of the structural adhesive can reduce takt times of a vehicle assembly structure 102 moving within or between adjacent automated assembly cells 304 in a vehicle assembly line, for example.

Figure 10A:
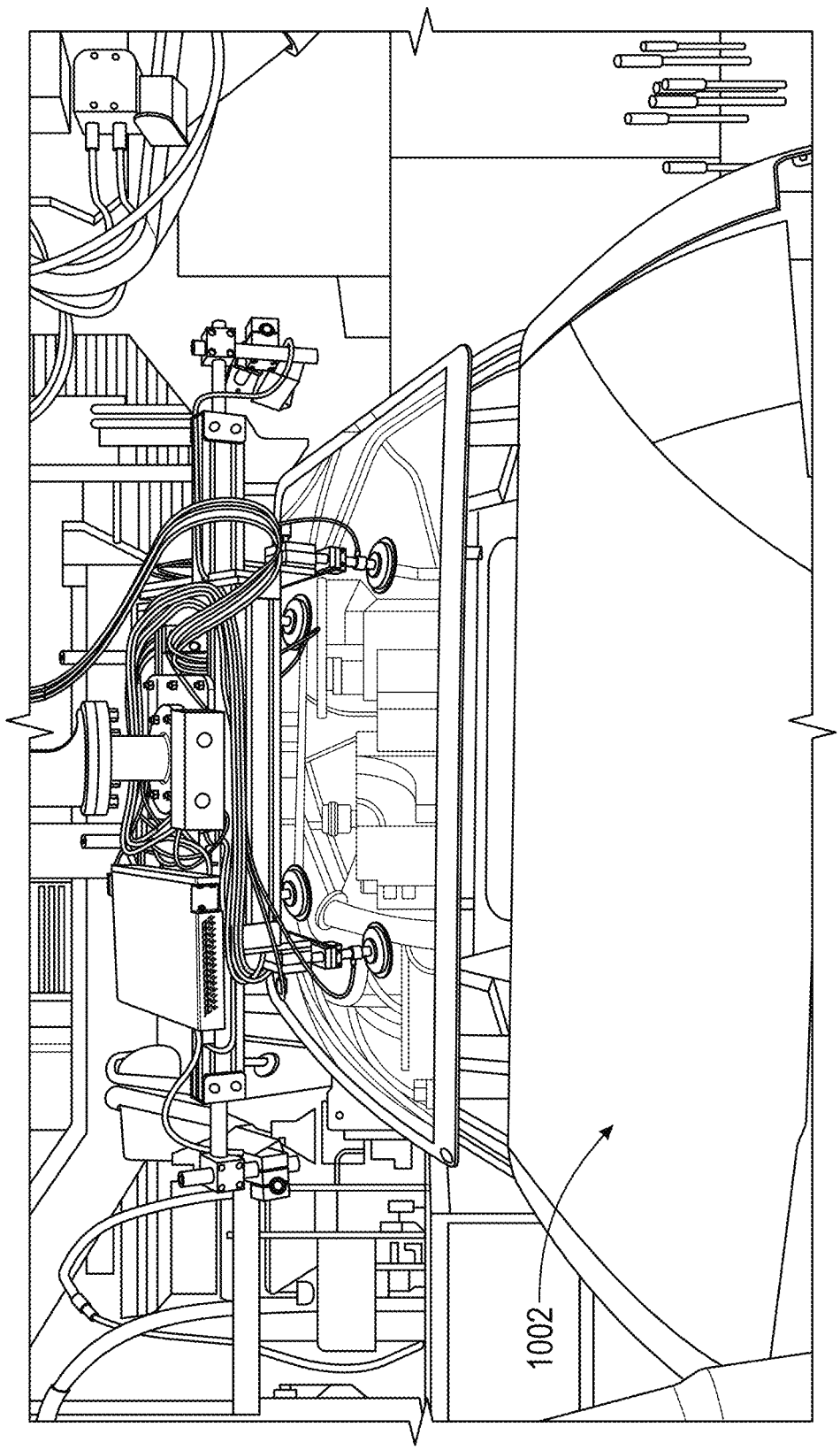

By way of further examples, in FIG. 10A, a partly assembled vehicle 1002 (including a vehicle assembly structure 102) has entered a framing station in an automated assembly cell 304 and is supported underneath by datum structures. One of the datums includes a global datum, for example a singular or reference global datum 402 of the type described above.

Figure 10C:
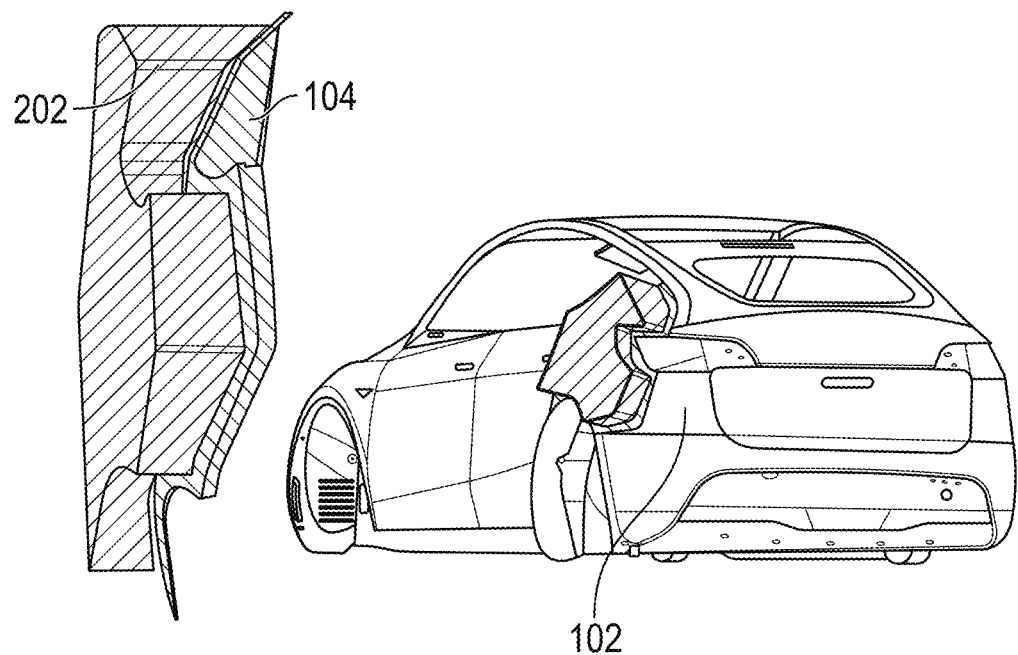

In FIG. 10B, one or more arms of a robot 1004 apply urethane as structural adhesive 210 where needed to one or more exterior vehicle parts 104, such as the illustrated vehicle glazing 404. In FIG. 10C, further exterior vehicle parts 104 are assembled (adhered) to the vehicle assembly structure 102 of the vehicle 1002 using one or more respective fixtures 202 and structural adhesive 210, as described above. The exterior vehicle parts 104 are placed into nominal position, utilizing self-piercing datums in some examples.

In some examples, the structural adhesive 210 includes Betaseal 15709 available currently at $25.07/gal or $5.21/kg. An example application of the structural adhesive 210 is approximately 80 g/m in an 8 mm-16 mm bead of structural adhesive 210. In some examples, a maximum 60 meters (total length or perimeter) of structural adhesive 210 is applied to one or more exterior vehicle parts 104, corresponding to approximately 4.8 kg and $25 of structural adhesive 210. 3.

Figure 10D:
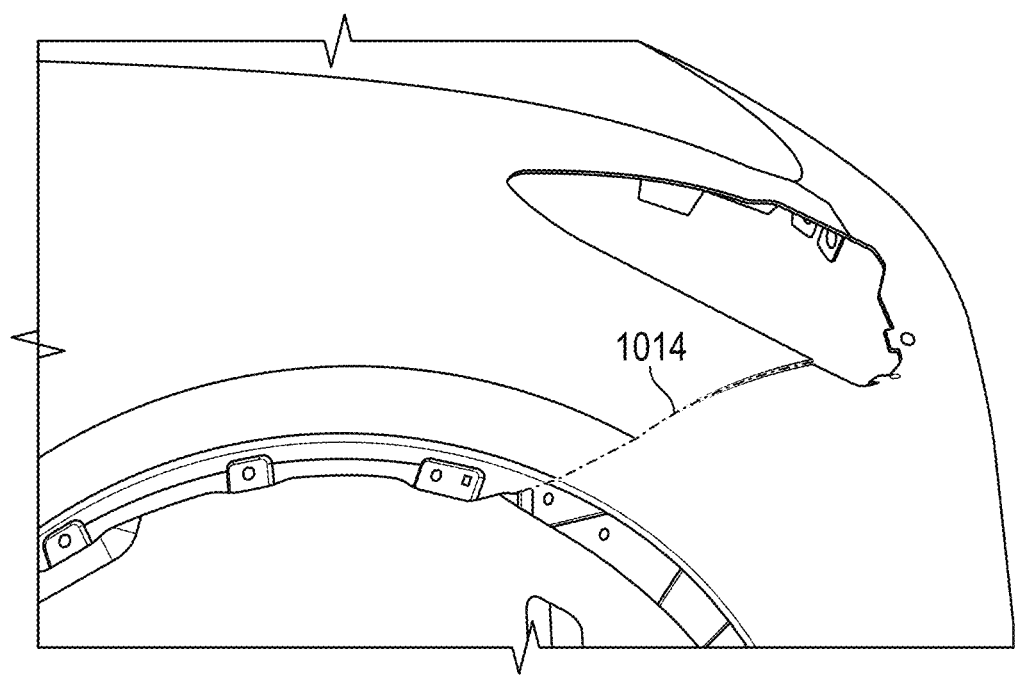

In FIG. 10D, in some examples, interlocking panels among the assembled exterior vehicle parts 104 are clipped into each other, as shown at clipping 1014, prior to exiting the framing station of the automated assembly cell 304.

Figure 11:
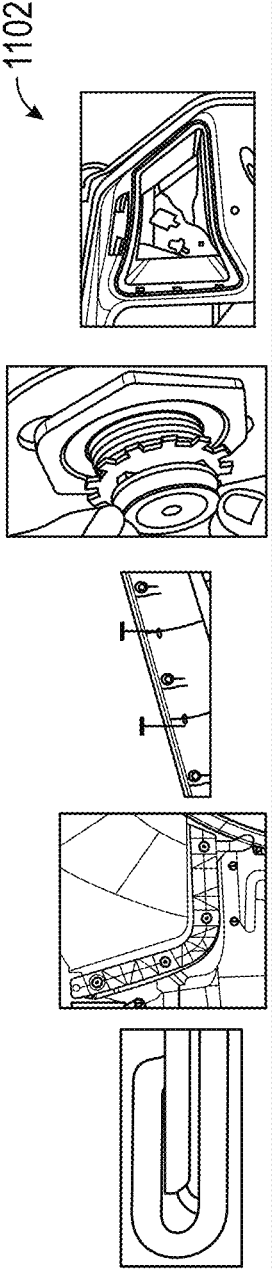
FIG. 11 provides a comparison table showing comparative values and specifications for the disclosed method of attaching exterior vehicle parts to a vehicle assembly structure versus traditional methods, according to some examples.

FIG. 11 shows a comparison table 1102 showing comparative values and specifications for an example method of attaching exterior vehicle parts to a vehicle assembly structure of the present disclosure, as compared to other traditional methods referenced in the comparison table 1102.

In some examples, the fixture-set automated exterior part assembly system enhances serviceability by reducing the number of parts and fasteners required for exterior panel attachment. This simplification of the assembly process not only reduces labor costs but also makes it easier to service the vehicle since there are fewer components to remove and reinstall. Moreover, the system offers improvements in noise, vibration, and harshness (NVH) by eliminating discrete joining parts such as clips, pins, and fasteners. This can lead to a quieter and more comfortable ride for the occupants.

Some examples herein are highly compatible with automation, allowing for the automation of exterior assembly processes. This compatibility with automation technologies contributes to a reduction in takt time and labor requirements, thereby enhancing the overall efficiency of the vehicle assembly process. In some examples, the craftsmanship of the final product is also maintained or improved, as the system allows for repeatable placement of exterior surfaces, thus helping to ensure that each vehicle meets high-quality standards.

In some examples, the disclosed technology may find utility beyond the realm of automotive assembly, extending its applicability to the assembly of various subsystems within the automotive industry as well as other products that require assembly processes. A notable advantage of the disclosed technology is the potential to achieve a significant if not full reduction in the number of parts typically used for exterior panel fasteners and clipping components. This reduction represents a significant step towards the realization of full exterior automation, which in turn can contribute to a decrease in both the takt time and the labor required for assembly.

For illustrative purposes, consider the assembly of a cyber truck roof applique, which traditionally utilizes five mounting brackets, each comprising three parts. These fastening components represent a substantial 65% of the total parts count for this particular assembly. By implementing the disclosed technology and removing the fastening features, the total part count can be dramatically reduced from 23 to a mere 8 components.

A competitive advantage offered by some examples of the disclosed technology may be multifaceted. Firstly, the fixture-set automated exterior architecture ensures that exterior components are positioned in their nominal location with each assembly cycle. This precision facilitates the achievement of more stringent gap and flush targets, paving the way for the elimination of end-of-line refit requirements. Secondly, the technology offers a reduction in both part count and associated costs by eliminating the need for discrete joining parts such as clips, pins, and fasteners. Thirdly, improvements in NVH as well as reliability are realized through the removal of these discrete joining parts. Lastly, the automated exterior installation system significantly accelerates the takt time between vehicles when compared to traditional manual general assembly lines, enhancing overall production efficiency.

EXAMPLES

Thus, some embodiments may include one or more of the following examples.

Example 1. A method of attaching exterior vehicle parts to a vehicle assembly structure, the method comprising: providing an automated assembly cell having one or more fixtures, each fixture corresponding to an exterior vehicle part; referencing a global datum for aligning the exterior vehicle parts within the automated assembly cell; securing an exterior vehicle part to a respective fixture using a vacuum clamp or other clamping means; applying a structural adhesive to a secured exterior vehicle part or to a part-receiving location on the vehicle assembly structure; and moving the secured exterior vehicle part into a respective nominal position relative to the global datum to compress the structural adhesive and complete installation of the exterior vehicle part to the vehicle assembly structure.

Example 2. The method of example 1, wherein the part-receiving location is included in a body frame of the vehicle assembly structure.

Example 3. The method of example 1 or 2, wherein the exterior vehicle parts are moved serially into their respective nominal positions relative to the global datum.

Example 4. The method of any one of example 1 or 2, wherein at least some of the exterior vehicle parts are moved concurrently into their respective nominal positions relative to the global datum.

Example 5. The method of any one of examples 1-4, wherein the respective nominal position is or corresponds to an intended or final position of the exterior vehicle part within the vehicle assembly structure as determined by a design specification.

Example 6. The method of any one of examples 1-5, further comprising providing an adhesive gap to compensate for irregularities in an exterior vehicle part, a fixture, or a substructure of the vehicle assembly structure.

Example 7. The method of example 6, wherein the adhesive gap accommodates differential heating or material properties between an adhered exterior vehicle part and the vehicle assembly structure.

Example 8. The method of any one of examples 1-7, further comprising selecting a structural adhesive chemistry to adjust a vehicle assembly takt time, or a final mechanical property of an adhesive bond between an exterior vehicle part and the vehicle assembly structure.

Example 9. The method of any one of examples 1-8, wherein the structural adhesive includes polyurethane.

Example 10. The method of any one of examples 1-9, further comprising performing a tacking operation concurrently with an application of the structural adhesive to enable continued assembly of the vehicle assembly structure pending a curing of the structural adhesive.

Example 11. The method of example 10, wherein the tacking operation includes an application of one or more datum pins to the exterior vehicle part or the vehicle assembly structure to fix a tacked exterior vehicle part in its nominal position before the structural adhesive has cured.

Example 12. The method of example 11 or 12, wherein the one or more datum pins includes a self-piercing datum pin.

Example 13. The method of example 11 or 12, wherein the one or more datum pins includes a ridged datum pin for insertion into a piercing medium or other substrate to fix a tacked exterior vehicle part in its nominal position before the structural adhesive has cured.

Example 14. The method of any one of examples 11-13, wherein the one or more datum pins are heated prior to installation.

Example 15. The method of any one of examples 10-14, wherein the tacking operation further includes a hot melt adhesive applied concurrently or in succession to the structural adhesive.

Example 16. The method of example 15, wherein the hot melt adhesive cures faster than the structural adhesive, facilitating an accelerated takt time.

Example 17. The method of any one of examples 1-16, further comprising interfacing additional exterior vehicle parts to the vehicle assembly structure downstream in an assembly line to further completion of an assembly of a vehicle.

Example 18. The method of example 17, wherein interfacing of the additional exterior vehicle parts to the vehicle assembly structure is devoid of a dimensional evaluation of an assembled vehicle.

Example 19. A system for attaching exterior vehicle parts to a vehicle assembly structure, the system comprising: an automated assembly cell with a respective fixture for each exterior vehicle part; a global datum for aligning the exterior vehicle parts within the automated assembly cell; a securing mechanism for holding an exterior vehicle part to a respective fixture using a vacuum clamp or other clamping means; a dispensing mechanism for applying a structural adhesive to a clamped exterior vehicle part or to a part-receiving location on the vehicle assembly structure; and a positioning mechanism for moving the clamped exterior vehicle part into a nominal position relative to the global datum to compress the structural adhesive and complete installation of the clamped exterior vehicle part to the vehicle assembly structure.

Example 20. The system of example 19, wherein the clamped exterior vehicle part is moved serially into the nominal position relative to the global datum.

Example 21. The system of example 19, wherein the clamped exterior vehicle part is moved into the nominal position concurrently with another exterior vehicle part.

Example 22. The system of any one of examples 19-21, wherein the nominal position is or corresponds to an intended or final position of the exterior vehicle part within the vehicle assembly structure as determined by a design specification.

Example 23. The system of any one of examples 19-22, wherein the system is configured to provide an adhesive gap to compensate for irregularities in an exterior vehicle part, a fixture, or a substructure of the vehicle assembly structure.

Example 24. The system of example 23, wherein the adhesive gap accommodates differential heating or material properties between an adhered exterior vehicle part and the vehicle assembly structure.

Example 25. The system of any one of examples 19-24, further comprising a tacking applicator for performing a tacking operation concurrently with an application of the structural adhesive to enable continued assembly of the vehicle assembly structure pending a curing of the structural adhesive.

Example 26. The system of example 25, wherein the tacking applicator is further configured to apply one or more self-piercing datums or a hot melt adhesive to one or more of the exterior vehicle parts.

In some examples, a method for assembling exterior vehicle parts to a vehicle assembly structure is provided, the method comprising utilizing an engineered adhesive gap to absorb tolerance discrepancies between exterior vehicle parts and the underlying structure, thereby decoupling panel gaps from body or closure assembly tolerances, and compensating for differential coefficients of thermal expansion (ACTE) between the exterior vehicle parts and the underlying structure to maintain part integrity and fit under varying temperature conditions.

In some examples, a vehicle assembly system comprises means for enhancing serviceability by reducing the number of discrete joining parts required for the attachment of exterior vehicle parts, thereby simplifying the assembly and service processes; and means for improving NVH characteristics of the vehicle by eliminating discrete joining parts.

In some examples, a method for assembling exterior vehicle parts to a vehicle assembly structure is provided, the method comprising implementing an assembly process that is compatible with automation technologies to reduce takt time and labor requirements; and ensuring repeatable placement of exterior surfaces to maintain or improve the craftsmanship of the final product.

It should be noted that the description and the figures above merely illustrate the principles of the present subject matter along with examples described herein and should not be construed as a limitation to the present subject matter. It is thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration.

Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few. The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Although the described flow diagrams herein can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Conditional language such as, among others, "can," "could," "might" or "may," unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A system for attaching exterior vehicle parts to a vehicle assembly structure, the system comprising:
   an automated assembly cell with a respective fixture for each exterior vehicle part;
   a global datum for aligning the exterior vehicle parts within the automated assembly cell;

a securing mechanism for holding an exterior vehicle part to a respective fixture using a vacuum clamp or other clamping means;

a robotic adhesive arm for applying a structural adhesive to a clamped exterior vehicle part or to a part-receiving location on the vehicle assembly structure; and a robotic part positioner for moving the clamped exterior vehicle part into a nominal position relative to the global datum to compress the structural adhesive and complete installation of the clamped exterior vehicle part to the vehicle assembly structure, wherein the system is configured to provide an adhesive a to compensate for irregularities in an exterior vehicle part a fixture, or a substructure of the vehicle assembly structure.

2. The system of claim 1, further comprising a tacking applicator for performing a tacking operation concurrently with an application of the structural adhesive to enable continued assembly of the vehicle assembly structure pending a curing of the structural adhesive.

3. The system of claim 2, wherein the tacking applicator is further configured to apply one or more self-piercing datums or a hot melt adhesive to one or more of the exterior vehicle parts.

4. The system of claim 1, wherein the clamped exterior vehicle part is moved serially into the nominal position relative to the global datum.

5. The system of claim 1, wherein the clamped exterior vehicle part is moved into the nominal position concurrently with another exterior vehicle part.

6. The system of claim 1, wherein the nominal position is or corresponds to an intended or final position of the exterior vehicle part within the vehicle assembly structure as determined by a design specification.

7. The system of claim 1, wherein the adhesive gap accommodates differential heating or material properties between an adhered exterior vehicle part and the vehicle assembly structure.

* * * * *

UNITED STATES PATENT AND TRADEMARK OFFICE
CERTIFICATE OF CORRECTION

| | |
|---|---|
| PATENT NO. | : 12,420,879 B1 |
| APPLICATION NO. | : 18/677172 |
| DATED | : September 23, 2025 |
| INVENTOR(S) | : Hunter Robert Normandeau et al. |

It is certified that error appears in the above-identified patent and that said Letters Patent is hereby corrected as shown below:

In the Specification

In Column 10, Line 56, after "Betaseal 15709" delete "available currently at $25.07/gal or $5.21/kg"

In Column 10, Line 62, after "4.8 kg" delete "and $25"

Signed and Sealed this
Eleventh Day of November, 2025

John A. Squires
*Director of the United States Patent and Trademark Office*